(12) United States Patent
Setlak

(10) Patent No.: US 10,474,866 B2
(45) Date of Patent: Nov. 12, 2019

(54) FINGER BIOMETRIC SENSOR INCLUDING CAPACITANCE CHANGE SENSING PRESSURE SENSING CIRCUIT AND RELATED METHODS

(71) Applicant: APPLE INC., Cupertino, CA (US)

(72) Inventor: Dale R. Setlak, Merritt Island, FL (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/017,622

(22) Filed: Jun. 25, 2018

(65) Prior Publication Data

US 2018/0373914 A1 Dec. 27, 2018

Related U.S. Application Data

(63) Continuation of application No. 15/617,056, filed on Jun. 8, 2017, now Pat. No. 10,007,830, which is a continuation of application No. 14/976,554, filed on Dec. 21, 2015, now Pat. No. 9,734,380.

(60) Provisional application No. 62/234,944, filed on Sep. 30, 2015.

(51) Int. Cl.
| | |
|---|---|
| *G06K 9/00* | (2006.01) |
| *G06F 3/041* | (2006.01) |
| *G06F 3/044* | (2006.01) |
| *G06F 21/32* | (2013.01) |
| *G06F 3/01* | (2006.01) |

(52) U.S. Cl.
CPC ........... *G06K 9/0002* (2013.01); *G06F 3/044* (2013.01); *G06F 3/0414* (2013.01); *G06F 21/32* (2013.01); *G06K 9/00087* (2013.01); *G06F 3/017* (2013.01); *G06F 2203/04105* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,727,561 | B2 * | 4/2004 | Sato | G06K 9/0002 257/414 |
| 6,759,264 | B2 * | 7/2004 | Chou | G06K 9/0002 438/48 |
| 7,013,031 | B2 | 3/2006 | Kim et al. | |
| 7,205,621 | B2 * | 4/2007 | Sato | G06K 9/0002 257/414 |
| 7,277,563 | B2 | 10/2007 | Chou | |
| 7,822,239 | B2 | 10/2010 | Chou | |
| 7,978,175 | B2 * | 7/2011 | Orsley | G06F 3/016 345/157 |
| 8,633,916 | B2 * | 1/2014 | Bernstein | G06F 3/016 345/174 |

(Continued)

*Primary Examiner* — Anand P Bhatnagar
(74) *Attorney, Agent, or Firm* — Allen, Dyer, Doppelt + Gilchrist, P.A.

(57) ABSTRACT

A finger biometric sensor may include a lower conductive layer, an upper conductive layer, and a spacer between the lower and upper conductive layers to define an air gap therebetween. The finger biometric sensor may also include a finger biometric sensing integrated circuit (IC) above the upper conductive layer and capable of deflecting the upper conductive layer toward the lower conductive layer to change a capacitance thereof based upon pressure applied to the finger biometric sensing IC. A pressure sensing circuit may be coupled to the lower and upper conductive layers to sense the change in capacitance.

18 Claims, 3 Drawing Sheets

(56) References Cited

U.S. PATENT DOCUMENTS

| | | | |
|---|---|---|---|
| 9,274,654 B2 | 3/2016 | Slobodin et al. | |
| 9,280,248 B2* | 3/2016 | Bernstein | G06F 3/016 |
| 9,349,552 B2* | 5/2016 | Huska | G06F 3/016 |
| 9,400,880 B2* | 7/2016 | Gooding | G06F 21/32 |
| 9,836,153 B2* | 12/2017 | Yamano | G06F 3/0414 |
| 9,977,539 B2* | 5/2018 | Lee | G02F 1/133345 |
| 10,068,728 B2* | 9/2018 | Huska | G06F 3/016 |
| 2003/0001874 A1* | 1/2003 | Kriechbaum | A61F 4/00 715/701 |
| 2005/0214960 A1* | 9/2005 | Sato | G06K 9/0002 438/17 |
| 2006/0057756 A1* | 3/2006 | Sato | G06K 9/0002 438/50 |
| 2008/0093687 A1* | 4/2008 | Antaki | G06K 9/0002 257/415 |
| 2009/0231305 A1* | 9/2009 | Hotelling | G06F 3/0414 345/174 |
| 2010/0027854 A1* | 2/2010 | Chatterjee | G06F 3/016 382/124 |
| 2010/0231530 A1* | 9/2010 | Lin | G06F 3/044 345/173 |
| 2012/0019479 A1* | 1/2012 | Lin | G06F 3/044 345/174 |
| 2012/0092279 A1* | 4/2012 | Martin | G02B 26/0833 345/173 |
| 2012/0092294 A1* | 4/2012 | Ganapathi | G02B 26/0833 345/174 |
| 2014/0216914 A1 | 8/2014 | Pope et al. | |
| 2018/0300522 A1* | 10/2018 | Shen | G06K 9/0002 |

* cited by examiner

FINGER BIOMETRIC SENSOR INCLUDING CAPACITANCE CHANGE SENSING PRESSURE SENSING CIRCUIT AND RELATED METHODS

TECHNICAL FIELD

The present invention relates to the field of electronics, and, more particularly, to the field of finger biometric sensors.

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger.

Where a fingerprint sensor is integrated into an electronic device or host device, for example, as noted above, it may be desirable to more quickly perform authentication, particularly while performing another task or an application on the electronic device. In other words, in some instances it may be undesirable to have a user perform an authentication in a separate authentication step, for example switching between tasks to perform the authentication. It may also be desirable for a fingerprint sensor to perform other functions beyond authentication.

SUMMARY

A finger biometric sensor may include a lower conductive layer, an upper conductive layer, and a spacer between the lower and upper conductive layers to define an air gap therebetween. The finger biometric sensor may also include a finger biometric sensing integrated circuit (IC) above the upper conductive layer and capable of deflecting the upper conductive layer toward the lower conductive layer to change a capacitance thereof based upon pressure applied to the finger biometric sensing IC. A pressure sensing circuit may be coupled to the lower and upper conductive layers to sense the change in capacitance. Accordingly, a pressure of the user's finger may be sensed, for example, for executing a corresponding device function based upon the sensed pressure.

The finger biometric sensor may further include a first dielectric layer between the finger biometric sensing IC and the upper conductive layer. A second dielectric layer may be above the finger biometric sensing IC, for example.

The finger biometric sensor may include a sidewall extending upwardly from the lower conductive layer and defining a recess receiving therein the spacer, upper conductive layer and finger biometric sensing IC. A flexible circuit may be coupled to the finger biometric sensing IC. The lower conductive layer may have an opening therein receiving the flexible circuit therethrough, for example. The finger biometric sensing IC may include an array of electric field finger biometric sensing pixels, for example.

A method aspect may be directed to a method of sensing a change in capacitance using a finger biometric sensor that includes a lower conductive layer, an upper conductive layer, a spacer between the lower and upper conductive layers to define an air gap therebetween, and a finger biometric sensing integrated circuit (IC) above the upper conductive layer. The method may include using a pressure sensing circuit coupled to the lower and upper conductive layers to sense the change in capacitance caused by deflection of the upper conductive layer toward the lower conductive layer. The deflection may be based upon pressure applied to the finger biometric sensing IC.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
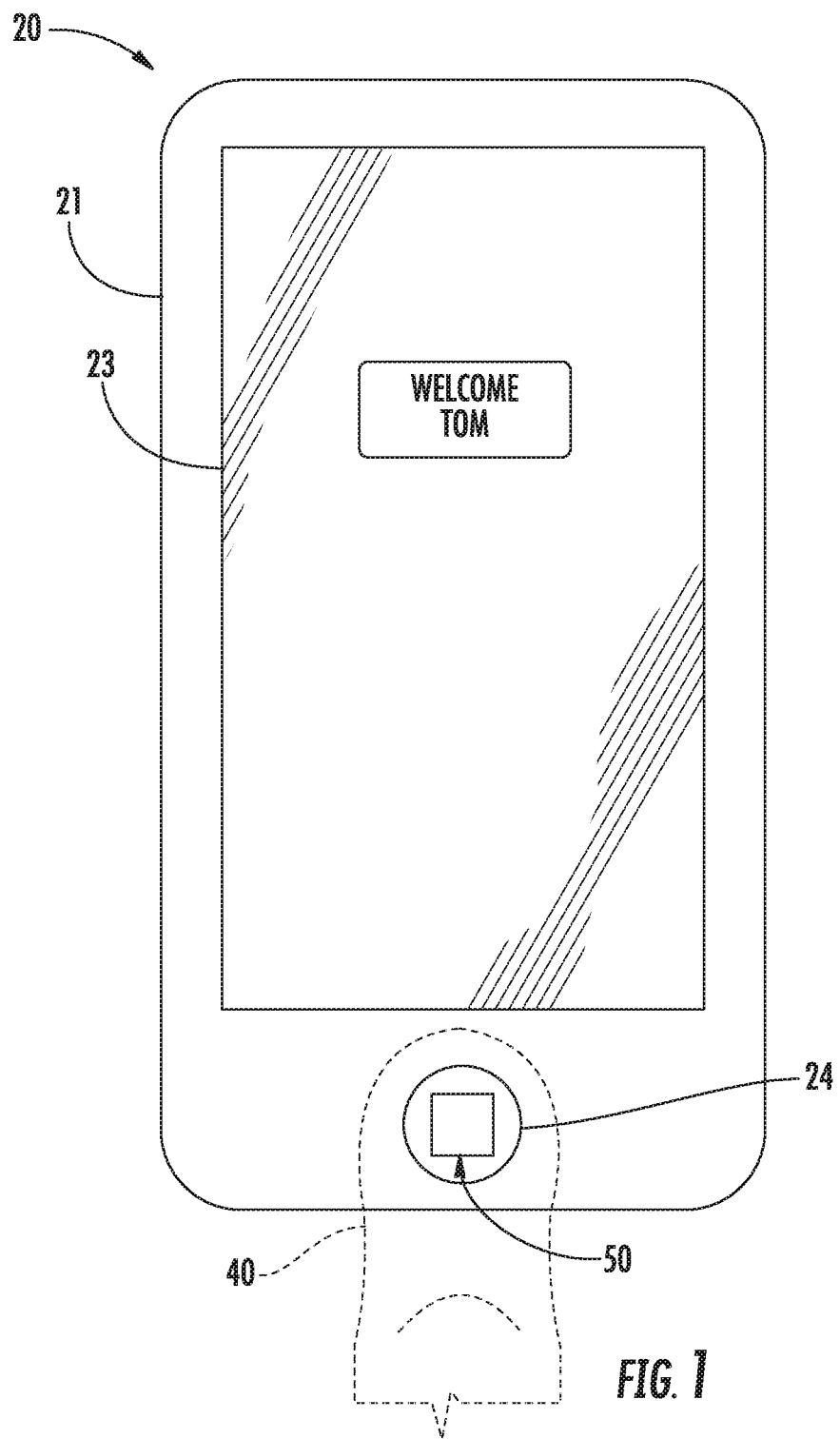
FIG. 1 is a plan view of an electronic device according to the present invention.
Figure 2:
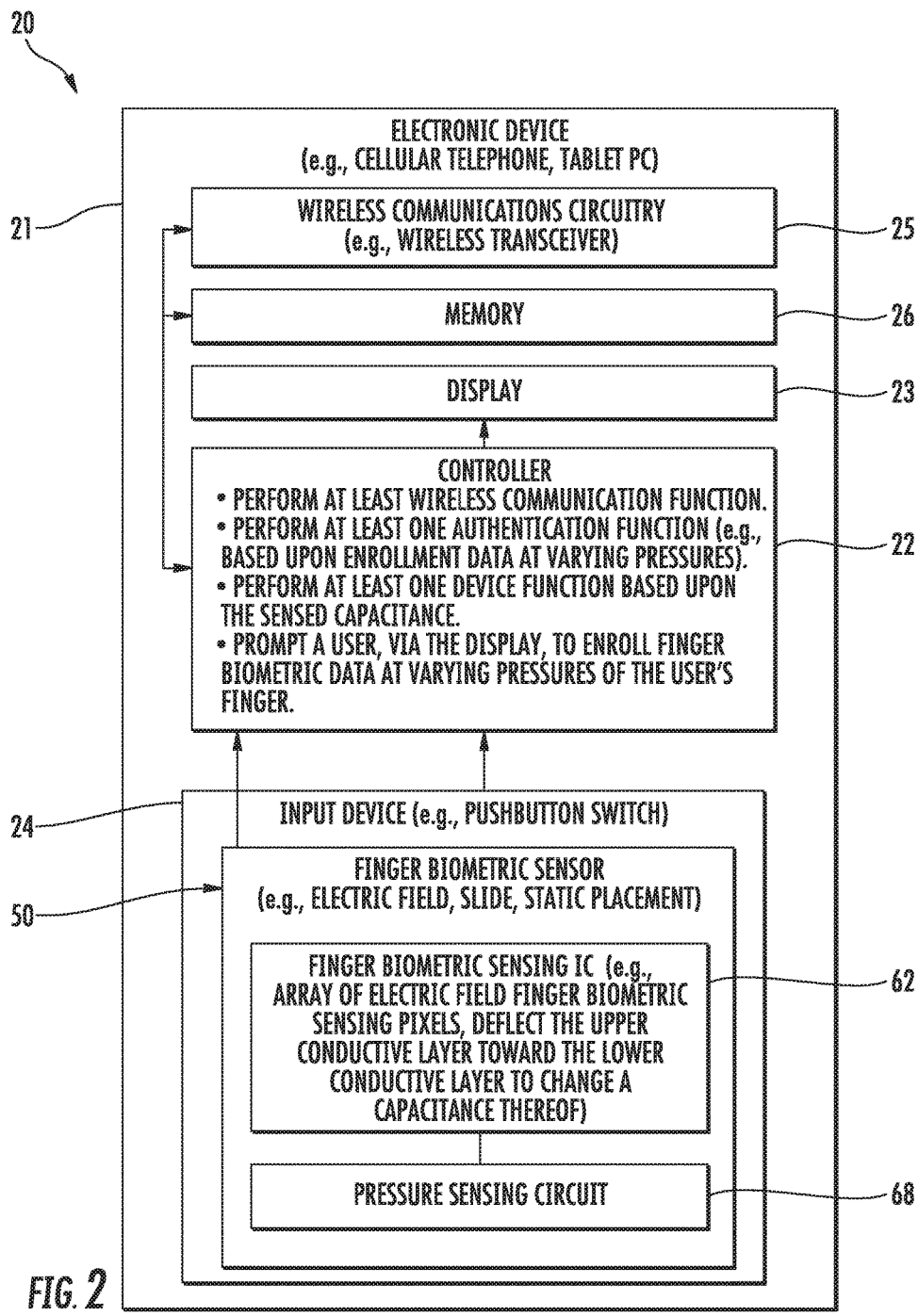
FIG. 2 is a schematic block diagram of the electronic device of FIG. 1.

Referring initially to FIGS. 1-2, an electronic device 20 is now described. The electronic device 20 illustratively includes a portable housing 21 and a controller 22 carried by the portable housing. The electronic device 20 is illustratively a mobile wireless communications device, for example, a cellular telephone. The electronic device 20 may be another type of electronic device, for example, a tablet computer, laptop computer, etc. In some embodiments, the electronic device 20 may be an integrated circuit for use with another or host electronic device.

Wireless communications circuitry 25 (e.g. a wireless transceiver, cellular, WLAN Bluetooth, etc.) is also carried within the housing 21 and coupled to the controller 22. The wireless transceiver 25 cooperates with the controller 22 to perform at least one wireless communications function, for example, for voice and/or data. In some embodiments, the electronic device 20 may not include a wireless transceiver 25.

A display 23 is also carried by the portable housing 21 and is coupled to the controller 22. The display 23 may be a liquid crystal display (LCD), for example, or may be another type of display, as will be appreciated by those skilled in the art. A device memory 26 is also coupled to the controller 22.

A finger-operated user input device, illustratively in the form of a pushbutton switch 24, is also carried by the portable housing 21 and is coupled to the controller 22. The pushbutton switch 24 cooperates with the controller 22 to perform a device function in response to the pushbutton switch. For example, a device function may include a powering on or off of the electronic device 20, initiating communication via the wireless communications circuitry 25, and/or performing a menu function.

More particularly, with respect to a menu function, the controller 22 may change the display 23 to show a menu of available applications based upon pressing of the pushbutton switch 24. In other words, the pushbutton switch 24 may be a home switch or button, or key. Of course, other device functions may be performed based upon the pushbutton switch 24. In some embodiments, the finger-operated user input device 24 may be a different type of finger-operated user input device, for example, forming part of a touch screen display. Other or additional finger-operated user input devices may be carried by the portable housing 21.

Figure 3:
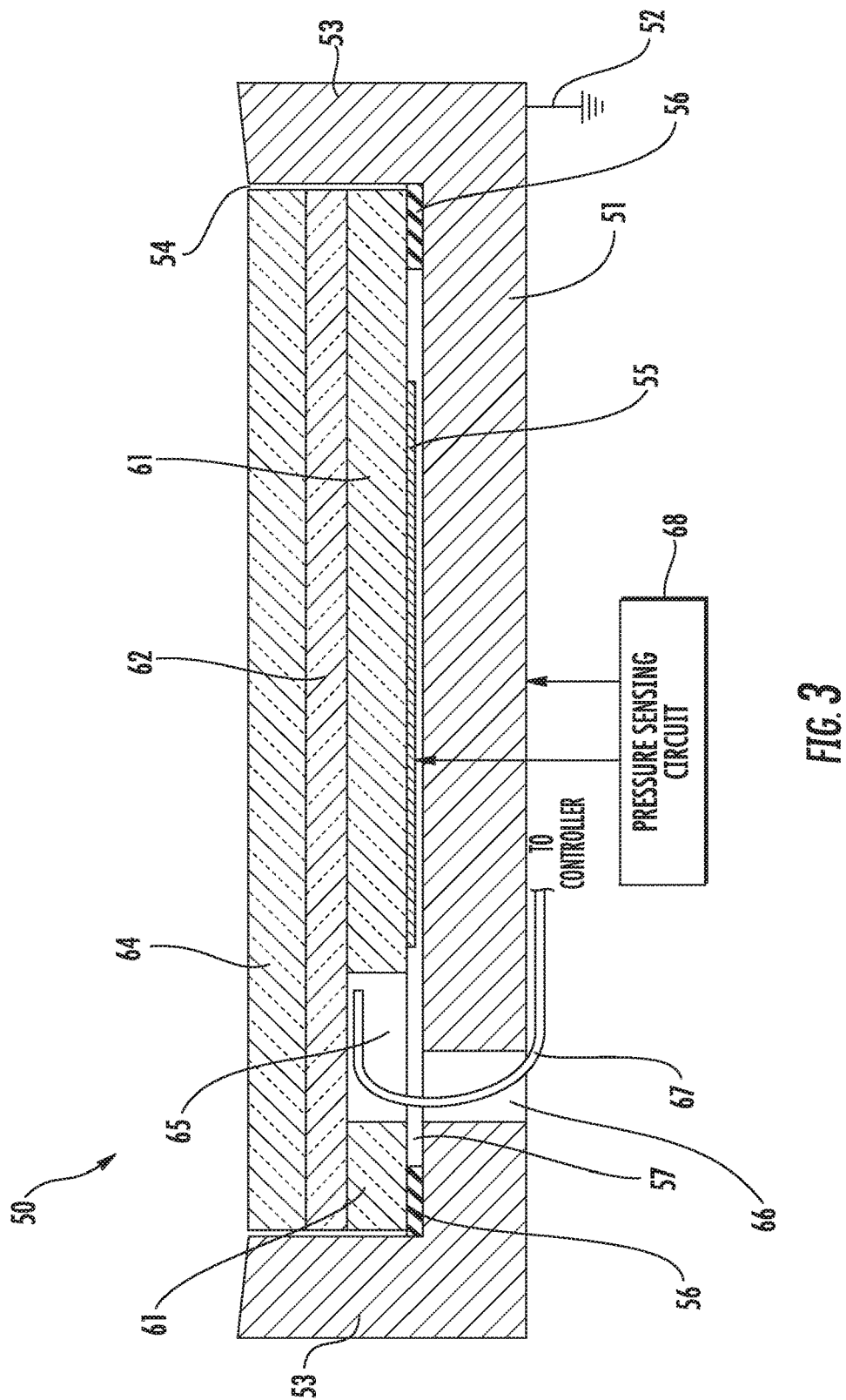
FIG. 3 is a cross-sectional view of the finger biometric sensor of FIG. 2.

Referring now additionally to FIG. 3, the electronic device 20 includes a finger biometric sensor 50 carried by the pushbutton switch 24. The finger biometric sensor 50 includes a lower conductive layer 51. The lower conductive layer 51 may be coupled to a voltage reference, for example, ground 52. A sidewall 53 extends upwardly from the lower conductive layer 51 and defines a recess 54 for receiving the components of the finger biometric sensor, as will be explained in further detail below. The sidewall 53 together with the lower conductive layer 51, define a finger sensor housing or trim, as will be appreciated by those skilled in the art.

The finger biometric sensor 50 also includes an upper conductive layer 55. The upper conductive layer 55 is spaced apart from the lower conductive layer 51 by way of a spacer 56 between the upper and lower conductive layers. The spacer 56 defines an air gap 57 between the upper and lower conductive layers 55, 51.

A first dielectric layer 61 carries the upper conductive layer 55 on a lower surface thereof. The first dielectric layer 61 may include glass, for example, and have a thickness that is selected based upon a stiffness thereof. In other words, a thicker first dielectric layer 61 may increase stiffness, while a thinner first dielectric layer may reduce stiffness. The first dielectric layer 61 may include another material. In an example embodiment, the first dielectric layer 61 may have a thickness of 210 microns, for example.

The finger biometric sensor 50 also includes a finger biometric sensing integrated circuit (IC) 62 above the upper conductive layer 55, and more particularly, carried by an upper surface of the first dielectric layer 61. In an example embodiment, the finger biometric sensing IC 62 may have a thickness of about 100 microns, for example.

The finger biometric sensing IC 62 includes an array of electric field finger biometric sensing pixels to sense a user's finger 40 or an object placed adjacent the array of finger biometric sensing pixels. The finger biometric sensing IC 62 is carried by the pushbutton switch 24 so that when a user or object contacts and/or presses downward on the pushbutton switch, data from the user's finger 40 is acquired, for example, for finger matching and/or spoof detection, as will be described in further detail below. In other words, the finger biometric sensing IC 62 may cooperate with circuitry, as will be explained in further detail below, to be responsive to static contact or placement of the user's finger 40 or object. Of course, in other embodiments, for example, where the finger biometric sensing IC 62 is not carried by a pushbutton switch 24, the array of finger biometric sensing pixels may cooperate with circuitry to be responsive to sliding contact (i.e. a slide sensor), or responsive to static placement (i.e. a standalone static placement sensor). Further details of electric field finger biometric sensing pixels are disclosed in U.S. Pat. No. 5,940,526 to Setlak et al., assigned to the present assignee, and the entire contents of which are herein incorporated by reference.

A second dielectric layer 64 is carried by an upper surface of the finger biometric sensing IC 62. The second dielectric layer 64 may be direct bonded to the finger biometric sensing IC 62 which may permit the second dielectric layer to be thinner than would otherwise be possible using conventional bonding techniques, for example, such as using glue. The second dielectric layer 64 may include sapphire, for example, and may be oxy-nitride treated. The second dielectric layer 64 may include another material. In an example embodiment, the second dielectric layer 64 may have a thickness of about 190 microns. In some embodiments, a cosmetic coating may be between the upper surface of the finger biometric sensing IC 62 and a lower surface of second dielectric layer 64.

The first dielectric layer 61 and the lower conductive layer 51 each have an opening 65, 66 therein. A flexible circuit 67 is coupled to the finger biometric sensing IC 62 and extends through the openings 65, 66, and, for example, to the controller 22.

During operation, a user's finger 40 is positioned adjacent the finger biometric sensing IC 62, and more particularly, on the second dielectric layer 64. The user's finger 40 during operation, provides downward pressure on the second dielectric layer 64, for example, at varying degrees, and consequently, downward pressure on the finger biometric sensing IC 62 and first dielectric layer 61. The bottom of the first dielectric layer 61 moves slightly downward with respect to the lower conductive layer 51. The finger biometric sensing IC 62 deflects the upper conductive layer 55 toward the lower conductive layer 51 to change a capacitance thereof based upon the pressure applied to the finger biometric sensing IC by the second dielectric layer 64. In other words, the upper and lower conductive layers 51, 55 define electrodes of a capacitor that have a varying distance therebetween based upon pressure of the user's finger adjacent the finger biometric sensing IC 62. The second dielectric layer 64 may flex slightly under pressure, for example, between about 5-10 microns at the center, which may not cause fatigue damage particularly if the second dielectric layer is oxy-nitride treated. The lower conductive layer 51 acts as a mechanical stop in the case of relatively high pressure. The relatively large area defined by the air gap 57 may increase sensitivity.

The finger biometric sensor 50 also includes a pressure sensing circuit 68 coupled to the controller 22 and lower and upper conductive layers 51, 55 to sense the change in capacitance. The controller 22 performs at least one device function based upon the sensed change in capacitance. For example, the controller 22 may cooperate with the pressure sensing circuit 68 to display on the display 23 a notification screen based upon a relatively small pressure, display a home page based upon a larger pressure, and turn on wireless communications functions based upon a relatively large pressure. Of course, the controller 22 may cooperate with the pressure sensing circuit 68 to perform any number and/or type of functions based upon different pressures, as will be appreciated by those skilled in the art.

The controller 22 may also cooperate with the finger biometric sensing IC 62 to determine a finger match based upon finger biometric data. More particularly, the processor 22 may determine a finger match based upon enrollment data stored in the device memory 26. The processor 22 may also determine a live finger based upon spoof data. More particularly, the processor 22 may determine a live finger based upon a complex impedance and/or bulk impedance measurement.

With respect to enrollment, in some embodiments, the controller 22 may also cooperate with the pressure sensing circuit 68 to prompt a user, via the display 23, to enroll finger biometric data at varying pressures of the user's finger adjacent the finger biometric sensing IC 62. The controller 22 may then perform at least one authentication function based upon the enrolled finger biometric data at the varying pressures. This may be particularly advantageous, for example, for performing a finger match or authentication with fingers having varying degrees of irregularities for example, sweat content and temperature variations, as will be appreciated by those skilled in the art. Additionally, the configuration described herein may be advantageous for low-power finger pressure sensing and increased mechanical robustness, which may, in turn, lead to a smaller finger biometric sensor 50, for example, a reduction of between 1-1.4 mm in diameter while maintaining performance.

In some embodiments, the controller 22 may cooperate with the array of electric field finger biometric sensing pixels 31 to perform a navigation function, for example. Of course the controller 22 may cooperate with the array of electric field finger biometric sensing pixels 31 and/or other circuitry to perform other or additional functions, as will be appreciated by those skilled in the art.

A method aspect may be directed to a method of sensing a change in capacitance using a finger biometric sensor 50 that includes a lower conductive layer 51, an upper conductive layer 55, a spacer 56 between the lower and upper conductive layers to define an air gap 57 therebetween, and a finger biometric sensing integrated circuit (IC) 62 above the upper conductive layer. The method may include using a pressure sensing circuit 68 coupled to the lower and upper conductive layers 51, 55 to sense the change in capacitance caused by deflection of the upper conductive layer toward the lower conductive layer. The deflection may be based upon pressure applied to the finger biometric sensing IC 62.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

Many modifications and other embodiments will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
   a housing;
   wireless communications circuitry carried by the housing;
   a touch screen display carried by the housing and comprising a lower conductive layer, an upper conductive layer, and a finger biometric sensor;
   a pressure sensing circuit coupled to the lower and upper conductive layers; and
   a controller coupled to the wireless communications circuitry, the touch screen display and the pressure sensing circuit, the controller configured to perform a plurality of different device functions corresponding to a plurality of different sensed pressures based upon the pressure sensing circuit.

2. The electronic device of claim 1 wherein one of the plurality of different device functions comprises a powering on function.

3. The electronic device of claim 1 wherein one of the plurality of different device functions comprises a wireless communications function.

4. The electronic device of claim 1 wherein one of the plurality of different device functions comprises a menu function.

5. The electronic device of claim 1 wherein the controller cooperates with the pressure sensing circuit to prompt a user, via the touch screen display, to enroll finger biometric data at varying pressures of the user's finger adjacent the finger biometric sensor.

6. The electronic device of claim 5 wherein the controller is configured to perform at least one authentication function based upon the enrolled finger biometric data at varying pressures.

7. The electronic device of claim 1 wherein the finger biometric sensor comprises an array of sensing pixels.

8. The electronic device of claim 1 wherein the pressure sensing circuit operates based upon a changing capacitance between the lower conductive layer and the upper conductive layer.

9. An electronic device comprising:
a housing;
wireless communications circuitry carried by the housing;
a touch screen display carried by the housing and comprising a lower conductive layer, an upper conductive layer, and a finger biometric sensor comprising an array of sensing pixels;
a pressure sensing circuit coupled to the lower and upper conductive layers and operating based upon a changing capacitance between the lower conductive layer and the upper conductive layer; and
a controller coupled to the wireless communications circuitry, the touch screen display and the pressure sensing circuit, the controller configured to perform a plurality of different device functions corresponding to a plurality of different sensed pressures based upon the pressure sensing circuit.

10. The electronic device of claim 9 wherein one of the plurality of different device functions comprises a powering on function.

11. The electronic device of claim 9 wherein one of the plurality of different device functions comprises a wireless communications function.

12. The electronic device of claim 9 wherein one of the plurality of different device functions comprises a menu function.

13. The electronic device of claim 9 wherein the controller cooperates with the pressure sensing circuit to prompt a user, via the touch screen display, to enroll finger biometric data at varying pressures of the user's finger adjacent the finger biometric sensor.

14. The electronic device of claim 13 wherein the controller is configured to perform at least one authentication function based upon the enrolled finger biometric data at varying pressures.

15. A method for making an electronic device comprising:
mounting wireless communications circuitry in a housing;
mounting a touch screen display in the housing and comprising a lower conductive layer, an upper conductive layer, and a finger biometric sensor;
coupling a pressure sensing circuit to the lower and upper conductive layers; and
coupling a controller to the wireless communications circuitry, the touch screen display and the pressure sensing circuit, the controller configured to perform a plurality of different device functions corresponding to a plurality of different sensed pressures based upon the pressure sensing circuit.

16. The method of claim 15 wherein one of the plurality of different device functions comprises a powering on function.

17. The method of claim 15 wherein one of the plurality of different device functions comprises a wireless communications function.

18. The method of claim 15 wherein one of the plurality of different device functions comprises a menu function.

* * * * *